United States Patent Office 2,735,760
Patented Feb. 21, 1956

2,735,760

CoCO₃ PRECIPITATION FROM Ni-Co SOLUTIONS

Louis N. Allen, Jr., Short Hills, and Harry G. Bocckino, Iselin, N. J., assignors to Chemical Construction Corporation, New York, N. Y., a corporation of Delaware No Drawing. Application December 28, 1954, Serial No. 478,210

16 Claims. (Cl. 75—119)

This invention relates to the hydrometallurgy of nickel and cobalt. More specifically, it is concerned with the selective removal of substantially all the cobalt from solutions containing salts of both nickel and cobalt. Still more particularly, it involves a method whereby substantially all the cobalt content of such solutions is precipitated as a cobalt carbonate, leaving a solution from which metallic nickel is easily recovered by known methods.

Nickel and cobalt metals are very similar in many physical and chemical characteristics. The same is true of their salts and naturally occurring minerals. Moreover, minerals of both generally occur together in natural deposits and usually cannot be separated by ordinary mineral dressing practices. For these reasons, both metals are generally present in varying amounts in any solution resulting from any type of leaching of materials containing cobalt and nickel.

This results in many technical and economic problems. For instance, in most ordinary practices, small amounts of cobalt present in nickel ore concentrates represent but little benefit to the nickel producer. Very little cobalt available in such materials is recovered and sold as such, primarily because by current methods, the cost of separation equals or exceeds the addition value. Much, if not most, of the cobalt is lost in the slag from nickel smelting. The remainder is sold as "nickel" in nickel metal bullion or cathodes.

Similarly, small amounts of nickel present in cobalt concentrates, and therefore in the "cobalt" solutions after leaching, are of small value. It is generally either discarded, which is a considerable loss, or it is recovered with the "cobalt." In the latter case, the nickel becomes an impurity in the cobalt metal and generally the producer is not paid for it. While certain nickel and cobalt mixed metals are marketable as such, it is usually at a price below the value of the pure metals in separation products.

In conventional metallurgy of nickel and cobalt, then, the presence of smaller but appreciable quantities of either in sources of the other, i. e., in ores, ore concentrates, scrap metals, plant by-products and the like, presents a serious and difficult problem. This problem has heretofore been variously attacked.

Several methods of separating nickel and cobalt from ammonium carbonate leach liquors have been proposed. Most of these involve fractional distillation of ammonium carbonate. Liquor at different stages in the process thereby becomes concentrated with either nickel or cobalt. So-concentrated liquor may then be removed and treated separately. The residue must also be redissolved and retreated separately. However, either as to processing methods or as to product metals, these are not entirely satisfactory.

In recent years, much attention has been given to the possibility of selectively reducing one of the metals in a conjoint solution of nickel and cobalt values directly to metal powder, using a suitable reducing gas. It has been found that under the proper conditions, nickel can be selectively reduced, the cobalt being retained in solution. However, the degree of selectivity is adversely affected as the amount of nickel in solution decreases and the resultant ratio of dissolved-nickel to dissolved-cobalt decreases. The same problem is encountered in an aggravated form when the original ratio of dissolved-nickel to dissolved-cobalt ratio is too low.

Accordingly, considerable further study has been given to the problem of cobalt removal prior to nickel reduction, either to obtain a cobalt product or to improve the dissolved metal ratio of nickel to cobalt and thereby obtain a solution better suited to efficient selective reduction of nickel. In most such cases, the dissolved cobalt is converted in some manner to some less-soluble cobalt compound. Recently, one such process has been proposed in which the solute content is adjusted to an available ammonia: dissolved metal mol ratio of about two or more and an ammonium carbonate: dissolved-metal ratio of from about 1:1 to about 1:4. Adjusted solution is then heated to some 170° C., in an atmosphere comprising hydrogen, and heating is continued until cobalt salt precipitation ceases.

For many purposes, this procedure is satisfactory. However, the method described requires the use of hydrogen, and employs temperatures well above 100° C. and therefore, requires the use of superatmospheric pressures, which in turn necessitates pressure vessels. For this reason, a process which eliminates any of these limitations is desirable. Accordingly, it is the object of the present invention to devise such a process.

In general, therefore, the process of the present invention contemplates an improvement in cobalt salt precipitation which permits the elimination of the use of hydrogen and the use, at atmospheric pressure, of temperatures not exceeding about 100° C. This is achieved by utilizing conditions which are simple and straightforward. They involve adjusting the solute content comprising nickel and cobalt values in an ammoniacal-ammonium salt solution to optimum conditions for retaining nickel in solution, adding powdered cobalt or nickel metal thereto, and evaporating or otherwise reducing the volume of the solution by some 5-30%, thus precipitating cobalt compounds. Resultant slurry is filtered and cobalt values are thus separated from residual solution containing predominantly nickel values.

Although, like the above-described procedure, the present process starts with a solute content adjustment, the basis therefor is quite different. Before inducing precipitation, the solution should contain enough ammonia as available ammonia and enough ammonium salt to insure the retention of cobalt and nickel values in solution at ambient conditions. In general, it will be desirable to use about two mols or more of available ammonia per mol of dissolved nickel plus cobalt, and from about one to about four mols of a compatible ammonium salt, such as ammonium carbonate, per mol of dissolved metals. Evaporation, or some other method of concentration of the solution, is then conducted to cause the precipitation of cobalt values as cobalt compounds.

In actual practice, some precipitation of an acceptable grade of nickel powder by gas reduction from a solution containing both nickel and cobalt values can be obtained from a solution of almost any dissolved metal ratio above about one. However, for reasons of economy, this fraction of the nickel does not become of desirable size until the ratio reaches some 3:1, and ratios of from 10:1 to as high as practicable are desired by a nickel producer. In the process of this invention, obtainment of a high nickel to low cobalt ratio in solution is readily achieved. If desired, substantially all the cobalt can be removed from the solution by our process. However, here, as in any such selective process, there is an optimum point beyond which as the solution becomes impoverished in one metal value (i. e., the cobalt value) the other metal value (i. e., the nickel value) will begin to concomitantly precipitate from solution along with the cobalt value at a rate sufficient to become troublesome.

As a practical matter, this means that the point at which the evaporation of the solution should be stopped must be pre-selected on the basis of different considerations. It is, of course, the most desirable practice that it be carried out so that both a saleable cobalt precipitation and a residual liquor of most desired nickel to cobalt mol ratio can be obtained. Achieving this optimum practice, however, is usually if not always possible. The exact operating end point will therefore vary depending upon (a) the ratio of nickel to cobalt in the original solution, (b) the optimum nickel to cobalt ratio in solution required by the nickel producer, and (c) the degree of purity of the cobalt desired.

If the latter two cannot be compromised in one operation, then the end point is selected in accordance with whichever is the principal object. Thus, for example, in treating a solution originally containing a dissolved-nickel to dissolved-cobalt ratio of from about 5:1 to about 10:1, at such concentrations that a salt does not precipitate from solution on heating to about 100° C., the following illustrative results are obtainable. Evaporation to the extent of removing some 5 to 10% by volume will produce about a 10:1 to 20:1 or more nickel to cobalt ratio in the residual liquor, while removing about 60 to 80% of the cobalt as a precipitate having a 50:1, or better, cobalt to nickel ratio, while precipitating less than 1% of the nickel. Continuing the evaporation to remove some 10 to 15% of the volume, this procedure will produce from about a 20:1 to about a 40:1 nickel to cobalt ratio in solution, while precipitating some 90% to 95% of the cobalt, but the gain is at the expense of precipitating up to several per cent of the nickel. Further continuing the evaporation so that about 15 to 20% of the volume is removed, the ratio of nickel to cobalt in the residual liquor may be raised to 300:1 or more while removing some 95 to 98% of the cobalt. However, as high as 20% to 35% of the nickel may precipitate. In continuing the evaporation to more than about 20% a 300:1 to 2,000:1 nickel to cobalt mol ratio in the residual liquor can be obtained. While at the higher evaporation rate the solution is almost completely impoverished in cobalt content, it is undesirable to so proceed because even though better than about 99% of the cobalt content will precipitate, it will do so along with about 75% of the nickel content. In general, therefore, it is a preferred embodiment of our invention to reduce the volume of the solution to the extent of some 5 to 30%, usually preferably from about 10 to about 20%, so as to obtain both a high-nickel, low-cobalt residual liquor and a high-cobalt, low-nickel precipitate.

While evaporation has been principally discussed as the concentrating method, it is advantageous to employ distillation apparatus. This has the advantage of permitting the recovery of ammonia and carbon dioxide for reuse. Temperatures in the range of from about 70° C. up to about 100° C. are utilized. Precipitation may be carried out in any suitable open or semi-closed vessel. While precipitation will eventually occur at room temperature, commercially it must take place in a reasonable time. Temperatures below about 70° C. are generally too low to expel sufficient ammonia and carbon dioxide from the solution within a preferred reasonable length of time of some 5 to 30 minutes. Conversely, the upper temperature limit is about 100° C. for the reason that all the ammonia and carbon dioxide would be dissipated if heating at this temperature is prolonged unduly. A good operating temperature range is from about 85° C. to about 100° C. which ordinarily will produce optimum precipitation within the desired time. While temperatures below 70° C. can be employed, the use of reduced pressure in the range of between about ¼ to about ½ atmosphere is then desirable to aid in the removal of water, ammonia, and carbon dioxide within a reasonable time.

As noted above, precipitation is effected in the presence of added powdered nickel or cobalt metal. When available, cobalt is preferred. It is believed that the use of powdered metal in the process of our invention maintains the cobalt ion in a reduced state, in which condition its compounds are less soluble than those of cobalt in a higher valence state. Advantageously, in our process some 5 to 30 grams of powdered nickel or cobalt metal per liter of solution are added to the ammoniacal-ammonium salt solution. However, any suitable amount of powdered metals sufficient to effect optimum cobalt precipitation by maintaining the cobalt ion in the reduced state may be used. In the absence of such powdered metal, nickel is not adequately retained in solution, but tends from the beginning of the treatment to precipitate out of solution, usually as a basic nickel carbonate. This nickel carbonate precipitate not only contaminates the cobalt precipitate but is exceedingly difficult to filter efficiently as it readily blinds the filter press.

It has been found that the particular particle size of the powdered metal is not critical. Coarse particles in the range of 50 mesh or lower can be used in the instant process. However, it is preferred to use a smaller particle size so that the solution to be treated will contact as large an area of the metal as is possible. This is to insure complete reduction of the cobalt content in the cobaltous valence state. It is, therefore, desirable to use a powdered metal which will pass freely through at least a 50 mesh screen, and preferably a 100 to 150 mesh screen. Smaller than about 250 mesh is not necessary and the usual practice will be to use about 100-150 mesh powder.

It is an advantage that the process of this invention is not limited to the treatment of carbonate liquors. Almost any anion which does not form a cobalt or nickel salt more insoluble than the carbonate may be present. However, it should be noted that some anions, such as cyanide or arsenide, form practically undissolved complexes, and their presence should be avoided if possible. Both carbonates and sulfates are commonly encountered in industrial practice. The sulfate is particularly notable in that the cobalt carbonate precipitate can be obtained from a solution containing nickel and cobalt sulfates merely by adding sufficient additional carbonate to insure formation of that salt.

Where, in the present discussion, adjustment of ammonium carbonate content has been noted, such adjustment may be made in several ways. It may be added as a solid or in aqueous solution. Alternatively, ammonia and carbon dioxide may be added separately or together as gases or dissolved in water. Mention in the claims of ammonium carbonate adjustment or addition is intended to include any of these methods.

It is believed that the effectiveness of the instant process can be demonstrated in the following examples. These are given by way of illustration and are not necessarily limiting. Except where otherwise noted, in each of the claims the illustrative solution was obtained in the leaching of ores containing cobalt and nickel.

EXAMPLE 1

To one liter of a leach solution which assays in grams per liter:

Ni ---------------------------------------- 8.65
Co ---------------------------------------- 1.1
$NH_3$ ---------------------------------------- 60.1
$CO_2$ ---------------------------------------- 39.0 were added 25 grams of minus 100 mesh cobalt powder.

The resultant solution was charged to an open vessel in which it was heated with stirring at from 90° C. to 98° C. In different runs the solution was evaporated to about 85%, 82.5% and 72% of the original volume respectively. The solids and solution contents are set forth in Table I, below, from which it can be seen that in this case optimum precipitation of cobalt occurs: (1) at about a 16-18% volume reduction, if the nickel to cobalt ratio in the residual solution is the criterion; (2) at about 15%, if low nickel content in the cobalt precipitate is important.

*Table I*

| Approximate Percent Evaporated | Solution Ni (g./l.) | Solution Co (g./l.) | Ni/Co Ratio in Solution | Percent Ni Precipitated | Percent Co Precipitated |
|---|---|---|---|---|---|
| 15 | 10.13 | 0.244 | 41.7/1 | 1.1 | 80 |
| 17.5 | 8.26 | 0.026 | 318/1 | 33.5 | 98 |
| 28 | 2.80 | 0.0013 | 2,150/1 | 80.0 | 99.9 |

EXAMPLE 2

Example 1 was repeated except that in each run about 15 grams of minus 100 mesh nickel powder were added to 1 liter of the solution assaying in grams per liter:

Ni ------------------------------------------------- 10.0
Co ------------------------------------------------- 1.0
$NH_3$ ------------------------------------------------ 60.1
$CO_2$ ------------------------------------------------ 39.0

The resultant solution was charged to a distillation still and heated to from about 90° C. to 100° C. After concentrating the solution by volume reduction, reductions of 15%, 17.5%, 20% and 29% respectively, the solids and solution contents were reported. These results are tabularized below.

*Table II*

| Approximate Percent Evaporated | Solution Ni (g./l.) | Solution Co (g./l.) | Ni/Co Ratio in Solution | Percent Ni Precipitation | Percent Co Precipitation |
|---|---|---|---|---|---|
| 15 | 11.07 | 0.348 | 31.8/1 | 6.0 | 70.4 |
| 17.5 | 11.06 | 0.035 | 316/1 | 9.0 | 97.1 |
| 20 | 8.05 | 0.029 | 278/1 | 35.6 | 97.7 |
| 29 | 7.30 | 0.017 | 430/1 | 48.2 | 99.0 |

From the results shown above, the optimum cobalt value precipitation appears to occur at about 17-18% evaporation, which results in a solution containing a dissolved-nickel to dissolved-cobalt ratio of about 300:1 and better.

In the preceding discussion, and particularly in the examples, it has been brought out that the criteria for the determination of how much cobalt value is to be precipitated, may be varied. For instance, when it is desired to produce a residual liquor which is suitable for production of nickel metal powder of negligible cobalt content, it may be necessary to carry out the cobalt precipitation to a point at which it is highly contaminated with nickel compounds. If nickel metal powder were the added metal powder, it could be removed from the precipitate as such by known methods. However, if the nickel contaminant is as nickel compound, the precipitate must be recycled or otherwise processed to recover both the nickel and the cobalt. If it is necessary to carry the cobalt stripping to a point where the nickel content is high, the recycling of such large volume may have an adverse effect on the overall efficiency of the process.

It has also been noted above that in the early stages of cobalt value precipitation, the precipitate comprises substantially only cobalt compound of very low nickel content. Such cobalt content can be slurried in water and reduced with hydrogen to produce cobalt metal. If cobalt metal powder is the added powdered metal, the latter need not be removed from the precipitate. For this reason, it may be advantageous in utilizing this preferred procedure to carry out the evaporation in two stages. In the first, only so much cobalt compound is precipitated as is sufficiently free from nickel so as to be easily converted to high grade cobalt metal powder. Thereafter, residual liquor can be further treated in accordance with the present invention to obtain the desired optimum dissolved metal ratio of nickel to cobalt which solution is suitable for selective hydrogen reduction of the nickel.

We claim:

1. In recovering high purity nickel from ammoniacal-ammonium salt solution containing dissolved nickel and cobalt values in which the cobalt content is precipitated as a carbonate by adjusting the ammonia and ammonium salt content of the solution to retain the nickel in solution and heating so-adjusted solution to selectively precipitate cobalt carbonate, the combination therewith of the improvement characterized by carrying out the heating of the adjusted solution in the presence of about 5 to about 30 grams per liter of at least a minus 50 mesh powdered metal selected from the group consisting of nickel and cobalt.

2. The method according to claim 1 wherein the metal is nickel.

3. The method according to claim 1 wherein the metal is cobalt.

4. The method according to claim 1 wherein the solution is heated at from about 70° C. to about 100° C.

5. The method according to claim 1 wherein the powdered metal passes through a minus 100 to minus 150 mesh screen.

6. The method of recovering high purity nickel from ammoniacal-ammonium salt solutions containing dissolved nickel and cobalt values which comprises the improved steps of: adjusting the ammonia and ammonium salt content of the solution to retain the nickel in solution, adding thereto about 5 to about 30 grams per liter of at least a minus 50 mesh powdered metal selected from the group consisting of nickel and cobalt, heating the solution at from about 70° C. to about 100° C. for sufficient time to remove from 5% to 30% of the original total volume and removing resultant precipitate, whereby high-nickel, low-cobalt content solution is obtained.

7. The method according to claim 6 wherein the volume of the solution is reduced from about 15% to about 20%.

8. The method according to claim 6 wherein the volume of the solution is reduced by evaporation.

9. The method according to claim 6 wherein the volume of the solution is reduced by fractional distillation.

10. The method according to claim 6 wherein the powdered metal passes through a minus 100 to minus 150 mesh screen.

11. The method of recovering high purity nickel values from ammoniacal-ammonium salt solutions containing dissolved nickel and cobalt values, which comprises the improved steps of: retaining in a solution consisting of nickel and cobalt values the nickel content thereof by the addition of two mols of ammonia and from one to four mols of ammonium carbonate per mole of dissolved nickel values, adding thereto about 5 to about 30 grams per liter of at least a minus 50 mesh powdered metal selected from the group consisting of nickel and cobalt, heating the solution at from about 70° C. to about 100° C. for a sufficient time to remove from 5% to 30% of the original total volume, and removing resultant precipitate whereby high-nickel, low-cobalt content solution is obtained.

12. The method according to claim 11 wherein the volume of the solution is reduced from 15% to 20% by evaporation.

13. The method according to claim 11 wherein the volume of the solution is reduced from about 15% to 20% by fractional distillation.

14. The method according to claim 11 wherein the metal is nickel.

15. The method according to claim 11 wherein the metal is cobalt.

16. The method according to claim 11 wherein the powdered metal passes through a minus 100 to minus 150 mesh screen.

References Cited in the file of this patent

UNITED STATES PATENTS

| | | |
|---|---|---|
| 1,164,141 | Sulzberger | Dec. 14, 1915 |
| 1,487,145 | Caron | Mar. 18, 1924 |
| 1,592,306 | Lienhardt | July 13, 1926 |
| 2,232,527 | Hill | Feb. 18, 1941 |
| 2,695,228 | Lebedeff | Nov. 23, 1954 |

FOREIGN PATENTS

| | | |
|---|---|---|
| 638,651 | Great Britain | June 14, 1950 |
| 683,679 | Great Britain | Dec. 3, 1952 |